(12) United States Patent
Chaney et al.

(10) Patent No.: US 6,580,939 B1
(45) Date of Patent: Jun. 17, 2003

(54) METHOD AND SYSTEM FOR REDUCING BACKGROUND ARTIFACTS FROM UNIFORMLY REDUNDANT ARRAY COLLIMATORS IN SINGLE PHOTON EMISSION COMPUTED TOMOGRAPHY

(75) Inventors: Roy C. Chaney, Wylie, TX (US); Olga Vassilieva, Plano, TX (US)

(73) Assignee: Board of Regents, The University of Texas System

( * ) Notice: Subject to any disclaimer, the term of this patent is extended or adjusted under 35 U.S.C. 154(b) by 301 days.

(21) Appl. No.: 09/702,716

(22) Filed: Oct. 31, 2000

Related U.S. Application Data

(60) Provisional application No. 60/163,633, filed on Nov. 4, 1999.

(51) Int. Cl.[7] .................................................. A61B 5/05
(52) U.S. Cl. .................. 600/425; 600/436; 250/363.02; 250/363.1
(58) Field of Search ................................ 600/425, 426, 600/427, 428, 429, 431, 1, 587, 436; 606/10; 250/363.02, 363.1, 363.06

(56) References Cited

U.S. PATENT DOCUMENTS

| | | | |
|---|---|---|---|
| 4,209,780 A | | 6/1980 | Fenimore et al. ........... 340/146 |
| 4,333,145 A | * | 6/1982 | Heuscher et al. ........... 600/425 |
| 4,506,374 A | | 3/1985 | Flynn ............................ 378/2 |

(List continued on next page.)

OTHER PUBLICATIONS

E. Fenimore and T. Cannon; Coded Aperture Imaging with Uniformly Redundant Arrays; *Applied Optics*; Feb. 1, 1978; vol. 17, No. 3; pp. 337 347.

T. Cannon, and E. Fenimore; Tomographical Imaging sUsing Uniformly Redundant Arrays; *Applied Optics*; Apr. 1979; vol. 18, No. 7; pp. 1052–1057.

Lee–Tzuu Chang, B. MacDonald, V. Perex–Mendez; Lawrence Berkeley Laboratory, University of California; *Applications of Optics in Medicine and Biology*; vol. 89, 1976; Comparisons of Coded Aperture Imaging Using Various Apertures and Decoding Methods, pp. 9–16.

P. Olmos, C. Cid, A. Bru, J.C. Oller, J.L. de Pablos, and J. M. Perez; Design of a Modified Uniform Redundant–Array Mask for Portable Gamma Cameras; Applied Optics; vol. 31, No. 23; Aug. 10, 1992; pp. 4743–4750.

P. Dunphy, M. McConnell, A. Owens, E. Chupp, D. Forrest and J. Goggins; Space Science Center, Institute for the Study of Earth, Oceans and Space (EOS) University of New Hampshire, Durham, New Hampshire 03824, USA; *Elsevier Science Publishers B.V.* (North Holland Physics Publishing Division); A Balloon–Borne Coded Aperture Telescope for Low–Energy Gamma–Ray Astronomy; Jun. 16, 1988; pp 362–379.

*Primary Examiner*—Teresa Walberg
*Assistant Examiner*—Fadi H. Dahbour
(74) *Attorney, Agent, or Firm*—Gardere Wynne Sewell LLP

(57) ABSTRACT

An apparatus and method is disclosed for use in medical imaging including a collimator having an array of positive apertures and an array of negative apertures formed thereon. A housed collimator directed at a detector to essentially eliminate all gamma radiation except that which enters the apertures of the collimator is used. During an imaging operation, a first image of a targeted photon source is generated through the collimator portion having a positive aperture arrangement. A second image of the targeted photon source is generated through the collimator portion having a negative aperture arrangement, wherein the first and second generated images are summed. The summation of these images causes a significant fraction of background artifacts to be reduced from a resulting summed representation of a targeted photon source.

20 Claims, 7 Drawing Sheets

U.S. PATENT DOCUMENTS

| | | | |
|---|---|---|---|
| 4,595,014 A | * 6/1986 | Barrett et al. | 600/431 |
| 4,659,935 A | 4/1987 | Hawman | 250/505 |
| 5,032,728 A | 7/1991 | Chang et al. | 250/363 |
| 5,037,374 A | * 8/1991 | Carol | 600/1 |
| 5,055,687 A | 10/1991 | Ichihara | 250/363 |
| 5,270,549 A | * 12/1993 | Engdahl | 250/363.1 |
| 5,311,427 A | 5/1994 | Ichihara | 364/413 |
| 5,337,231 A | * 8/1994 | Nowak et al. | 600/425 |
| 5,431,161 A | * 7/1995 | Ryals et al. | 600/425 |
| 5,481,115 A | 1/1996 | Hsieh et al. | 250/363 |
| 5,748,768 A | * 5/1998 | Sivers et al. | 600/425 |
| 5,757,005 A | 5/1998 | Callas et al. | 250/363 |
| 5,818,050 A | 10/1998 | Dilmanian et al. | 250/363 |
| 5,847,398 A | * 12/1998 | Shahar et al. | 250/363.1 |
| 5,999,836 A | * 12/1999 | Nelson et al. | 600/425 |
| 6,142,988 A | * 11/2000 | Strahle et al. | 606/10 |
| 6,234,978 B1 | * 5/2001 | Mihashi et al. | 600/587 |
| 6,353,227 B1 | * 3/2002 | Boxen | 250/363.1 |
| 6,377,838 B1 | * 4/2002 | Iwanczyk et al. | 600/425 |

* cited by examiner

METHOD AND SYSTEM FOR REDUCING BACKGROUND ARTIFACTS FROM UNIFORMLY REDUNDANT ARRAY COLLIMATORS IN SINGLE PHOTON EMISSION COMPUTED TOMOGRAPHY

This application is a conversion from and claims priority of U.S. Provisional Application No. 60/163,633, filed Nov. 4, 1999.

FIELD OF THE INVENTION

The present invention is directed to the field of medical imaging and, more particularly, to methods and systems for reducing background artifacts during single photon emission computer tomography applications and the like.

BACKGROUND OF THE INVENTION

Without limiting the scope of the invention, its background is described in connection with single photon emission computed tomography (SPECT), as an example.

The subject of medical imaging covers the interaction of all forms of radiation with human tissue and the development of the technology to receive useful information from observations of this interaction. The information obtained from the interaction between tissue and radiation is usually represented in the form of two- or three-dimensional images. Medical imaging has wide application in diagnostic medicine as well as for monitoring the treatment of disease.

Single photon emission computed tomography (SPECT) generally includes the detection of radiation emanating from inside the human body. Internally emitted photons arise from the decay of radioactive isotopes commonly called radionuclides. The radiopharmaceutical (i.e., pharmaceutical labeled with a specific radionuclide) is generally injected into the patient and localizes within one or more organs based on its biochemical properties. Hence, particular radiopharmaceuticals are used to illuminate specific organs.

SPECT has been used extensively to produce images of tumors within the body. SPECT uses detectors to register gamma ray photons emitted from radioactive isotopes injected into the body. Although the detection of these photons is not difficult, the location of their origin is challenging. Contrary to visible light, gamma ray photons cannot be focused by lenses to convey the location of their source, hence little directional information can be obtained from the detection of these high-energy photons. The only way to locate their origin has been to use a collimator to remove photons from unwanted directions.

A typical SPECT system includes one or more rotating scintillation cameras fitted with collimators. This collimator-detector system has significant effects on the quality of the images. In typical SPECT, a lead collimator is placed in front of the crystal to selectively remove photons from all directions except the one of interest. The collimator is typically about 2 or 3 cm in thickness. Collimators generally include a number of small channels (holes) that allow photons traveling within the desired acceptance angle to pass through and be registered by a detector. There are many different types of collimators used in SPECT, which differ in the number and the direction of orientation of the channels. These types of collimators have the fundamental problem that the only way to obtain better directional information is to reduce the acceptance angle of a channel. Unfortunately, this reduction in angle is accompanied by a significant reduction in the percentage of incident photons which are passed through the collimator. The collimator design is, therefore, a trade off between good resolution and adequate sensitivity.

Collimators designed using coded aperture arrays have been used in astrophysics to detect gamma rays (Fenimore and Cannon, 1978, Dunphy, et al., 1988). A coded aperture array collimator consists of many small holes (commonly referred to as apertures) that are arranged randomly along a flat plate. Each point on the emitting object deposits a shadow of the aperture on the detector. Computer processing of the picture yields a reconstructed image of the original object. They have the advantage that good resolution may be achieved without sacrificing sensitivity. These collimators have been suggested for medical applications (Fenimore and Cannon; 1979), but have not achieved much success.

SUMMARY OF THE INVENTION

The present invention is directed to the field of medical imaging and, more particularly, to methods and systems for reducing background artifacts during single photon emission computer tomography using coded aperture array collimators applications and the like.

An example of an application of this invention, as described hereinbelow, is in the area of breast tumors. During mammography exams, the primary diagnostic tool for detecting breast cancer is an x-ray mammograph. Patients with large amounts of glandular breast tissue are susceptible to false negative mammograms using standard mammography techniques. Presently, alternative techniques using SPECT have limited resolution and an improved method of detecting small lumps is needed.

The coded aperture array collimators have the advantage of providing good resolution, but previous designs have suffered from background artifacts. It would, therefore, be desirable to reduce the significance of the reconstructed artifacts during SPECT imaging. In accordance with the present invention, a medical imaging system and method is provided that creates an accurate composite image by adding two images together, thereby causing a significant fraction of the background artifacts to be removed. Substantial reduction of background artifacts is achieved by the present invention through the employment of a novel collimator design and method of its use.

In accordance with an aspect of the present invention, a collimator is provided that includes a positive apertured portion and a negative aperture portion. This type of composite collimator has been suggested previously to improve the image of stars in astrophysics. It has not, however, been used for reducing background artifacts in medical imaging. The positive aperture portion is used in medical imaging systems to receive a first photon-generated image from a photon source (e.g., the breast of a human subject). The negative aperture portion is used to receive a second photon-generated image from the photon source. Both images are received by a detector and are used to derive a more accurate representation of the photon source by removing noise and artifacts from the image.

In accordance with another aspect of the present invention, a collimating system is provided in which a collimator has positive and negative aperture sections, the collimator being movable within a housing having a slot formed therein for storing and promoting the independent exposure of either the positive or negative aperture sections to a photon energy source during imaging operations. A housing having a slot retains the collimator. A detector receives photon energy through the aperture section of the collimator.

In accordance with another aspect of the present invention, a method of photon emission computing tomography is provided in which a first image of a targeted photon source is generated through a collimator having a positive aperture arrangement. A second image of the targeted photon source is then generated through a collimator having a negative aperture arrangement. Finally, the first and second generated images are summed, thereby causing a significant fraction of background artifacts to be reduced from the resulting summed representation of the targeted photon source.

DETAILED DESCRIPTION OF THE DRAWINGS

The invention, in accordance with the described aspects and exemplary embodiments, together with further features and advantages thereof, is more particularly described in the following detailed description taken in conjunction with the accompanying drawings in which.

DETAILED DESCRIPTION OF THE INVENTION

Figure 1:
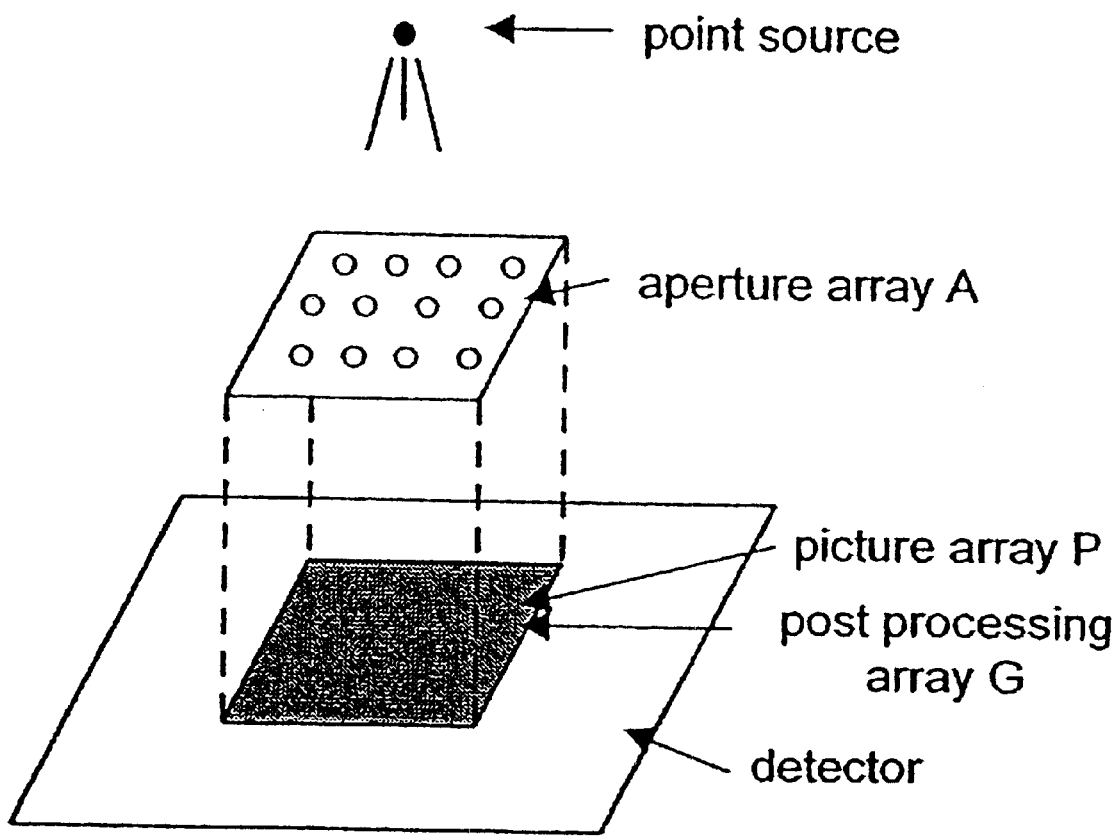
FIG. 1 illustrates a point source whose light passes through an aperture A to be detected as a picture array P. In this case the shadow is aligned with the region of the post-processing array G and the correlation produces a delta function with no side lobes.

While the making and using of various embodiments of the present invention are discussed in detail below, it should be appreciated that the present invention provides many applicable inventive concepts, which can be embodied in a wide variety of specific contexts. The specific embodiments discussed herein are merely illustrative of specific way to make and use the invention and do not delimit the scope of the invention. Reference will be made to SPECT throughout this disclosure and should not be interpreted as a limitation of the invention. The invention is directed at application broadly within the medical imaging arts.

Photon emission computing tomography, and in particular single photon emission computing technology (SPECT), begins with the injection of the radiopharmaceutical to "tag" or "label" a specific organ of interest. Radiopharmaceuticals used in SPECT are labeled with radionuclides that emit gamma ray photons. To obtain an image of radiation activity distribution SPECT imaging requires the collimation of the gamma rays emitted from the radionuclide that has been distributed within the body. Contrary to visible light, gamma rays can not be focused by lenses in the optical sense. Therefore, for an image to be formed, the relationship between the direction of emission of a gamma ray from radioactive source and its point of detection must be determined. A major goal of SPECT instrumentation development is to increase the detection efficiency, while at the same time improving the spatial resolution of the imaging system.

Collimators have been designed to allow detection of more photons. Increased detection efficiency, however, is achieved with a loss of spatial resolution. The purpose of the collimator is to confine the direction of incident photons reaching the detector. Collimation is, therefore, the only efficient way that a SPECT detector system may determine the location of the source and achieve spatial resolution. Collimators limit the number of detected photons by absorbing the radiation from unwanted directions.

The present invention may be described beginning with the recognition that coded aperture array collimators have proven to be successful when used in the field of astrophysics (Dunphy, et al., 1988). A coded aperture array collimator includes a number of pinholes (commonly referred to as apertures) that are arranged randomly along a plate or generally flat member. Each point on the emitting object deposits a shadow of the aperture on a detector. Computer processing of the detected picture yields a reconstructed image of the original object. Since the size of the shadow is proportional to the distance from the collimator, this method offers the prospect for three-dimensional tomographic imaging without reconstruction of multiple views of the object.

The present inventors recognized that in the case of astrophysics, the gamma source is a point object (for example a star) in an otherwise dark background. In the case of SPECT, one the other hand, the user is trying to view small changes in intensity produced by a higher concentration of the radioactive isotope in the tumor or organ of interest relative to the constant background, which accumulates in normal tissue. For example, in breast tumors, the ratio of intensity may be of the order of 5 to 10 times higher in the tumor relative to the background (Msublant, et al., 1996). In SPECT, the constant background produces artifacts in reconstructed images produced using current techniques, which obscure the identification of the source and lead to false diagnosis. The purpose of this invention, therefore, is to provide a different method of collecting the data captured by the SPECT detector and reconstructing the image in a way that significantly reduces background artifacts.

The present inventors have also recognized the limitations of known coded aperture array collimators. For example, the present inventors recognize the significant differences between astrophysics and tomography applications. In astrophysics, one tries to distinguish the emission of a photon from a single object in an otherwise dark background, while in tomography, one looks for a brighter source distributed within a somewhat uniform background. This background has two effects that deteriorate the reconstructed image. It has been shown that the background intensity reduces the signal to noise ratio of the reconstructed image. An even more serious problem, however, is that the background light may produce artifacts in the reconstructed image that can obscure or even eliminate the image from the brighter source and create false images. These artifacts have significant ramifications in medical imaging technology where an artifact may lead to a false diagnosis.

The importance of the apparatus and method disclosed herein may best be understood by using the equations involved in computer image processing. The source object may be defined as O(x,y), whose light passes through an aperture A(x,y), and produces an intensity profile picture array P(x,y) on the detector. The recorded picture may be expressed as the equation:

$$P = O \cdot A.$$

The reconstructed object array is determined by a correlation of P with a post processing array G such that:

$$O' = P \cdot G,$$

where G is constructed such that A_G is a delta function and $$O' = O \cdot A \cdot G = O \cdot \delta$$

correlation of A with G produces a perfect delta function with no side lobes if all terms in the correlation are included. A perfect delta function with no side lobes would be the case, if the object was the point source depicted in FIG. 1. A perfect delta function with no side lobes would not be the case if the object consists of, for example, a central point source, which is reconstructed in the presence of another background source at an off axis location shown in FIG. 2.

Figure 2:
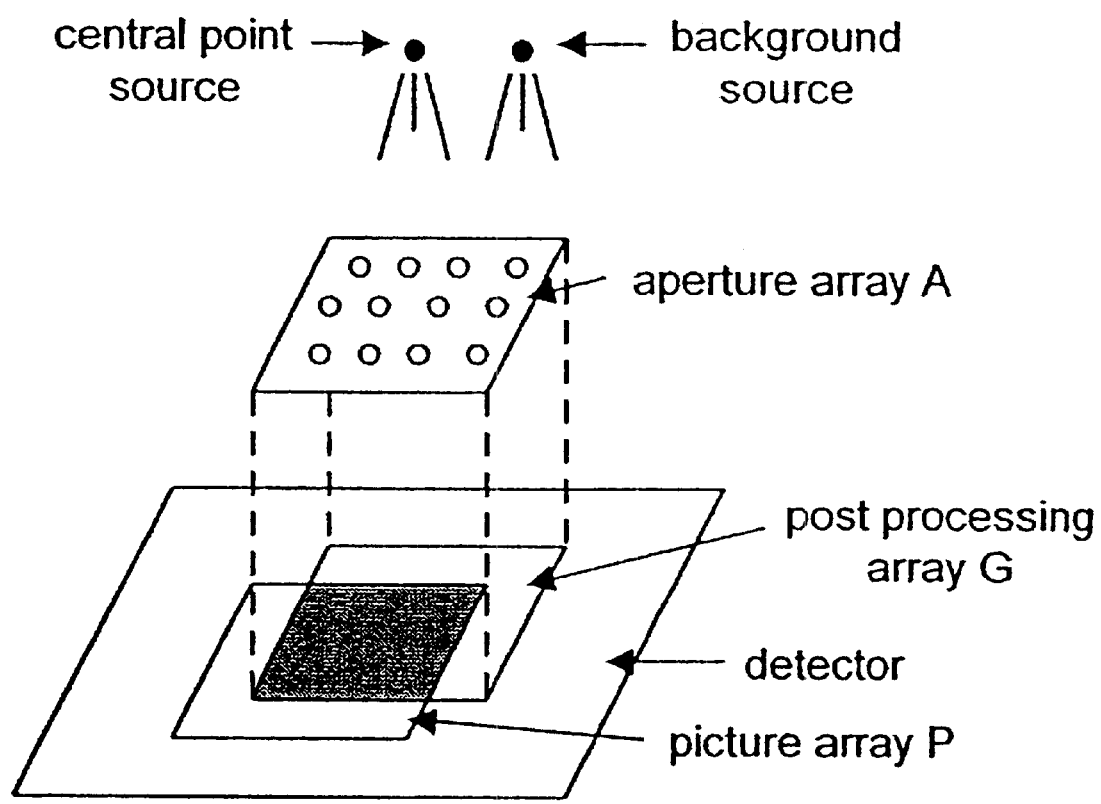
FIG. 2 illustrates the contribution from an off axis background point source to an image of an on axis point source. The shadow produced by the background point source is not aligned with the region of the post-processing array G and the correlation produces side lobes on the delta function.

FIG. 2 demonstrates that the post-processing array appropriate for the central point source is not properly aligned with the shadows cast by the background source. This causes a truncation in the correlation of A with G. This truncated correlation creates side lobes in the delta function and produces artifacts in the reconstructed picture. The function G has been chosen in an ad-hoc manner to optimize the total correlation of A with G. The apparatus and method disclosed herein provides a different means of reconstruction that minimizes the contribution from the background truncated correlation. The binary sequences, which form the coding pattern used in the aperture A are also found in communication systems and their properties have been studied extensively (MacWilliams and Sloane, 1976; Bomer and Antweiler, 1993). By optimizing the autocorrelation function, which is define as the correlation of G with itself, it may be shown that $$G \cdot G = \delta,$$

and that the truncated correlation of G with itself is small.

The challenge is to perform a reconstruction so that it involves G·G instead of A·G. By defining the two types of apertures $A^+$ (which has the same form as A), where the $A^-$ holes and opaque regions have been reversed, then:

$$G^+ = -1(G^-) = G,$$

$$A^+ - A^- = G.$$

This suggests forming a composite picture from the positive and negative apertures as:

$$P^+ = O \cdot A^+,$$

and $$P^- = O \cdot A^-.$$

The reconstruction is then performed using the two pictures:

$$O' = P^+ \cdot G^+ + P^- \cdot G^-$$

$$= O * A^+ \cdot G^+ + O \cdot A^- \cdot G^-$$

-continued $$= O \cdot (A^+ - A^-) \cdot G^+$$

$$= O \cdot G^+ \cdot G^+.$$

This reconstruction uses the correlation of G with itself, which produces a delta function on total reconstruction and minimizes the background artifacts. This type of composite image has been suggested before in conjunction with coded aperture arrays, but has never been used to reduce background artifacts.

Figure 3:
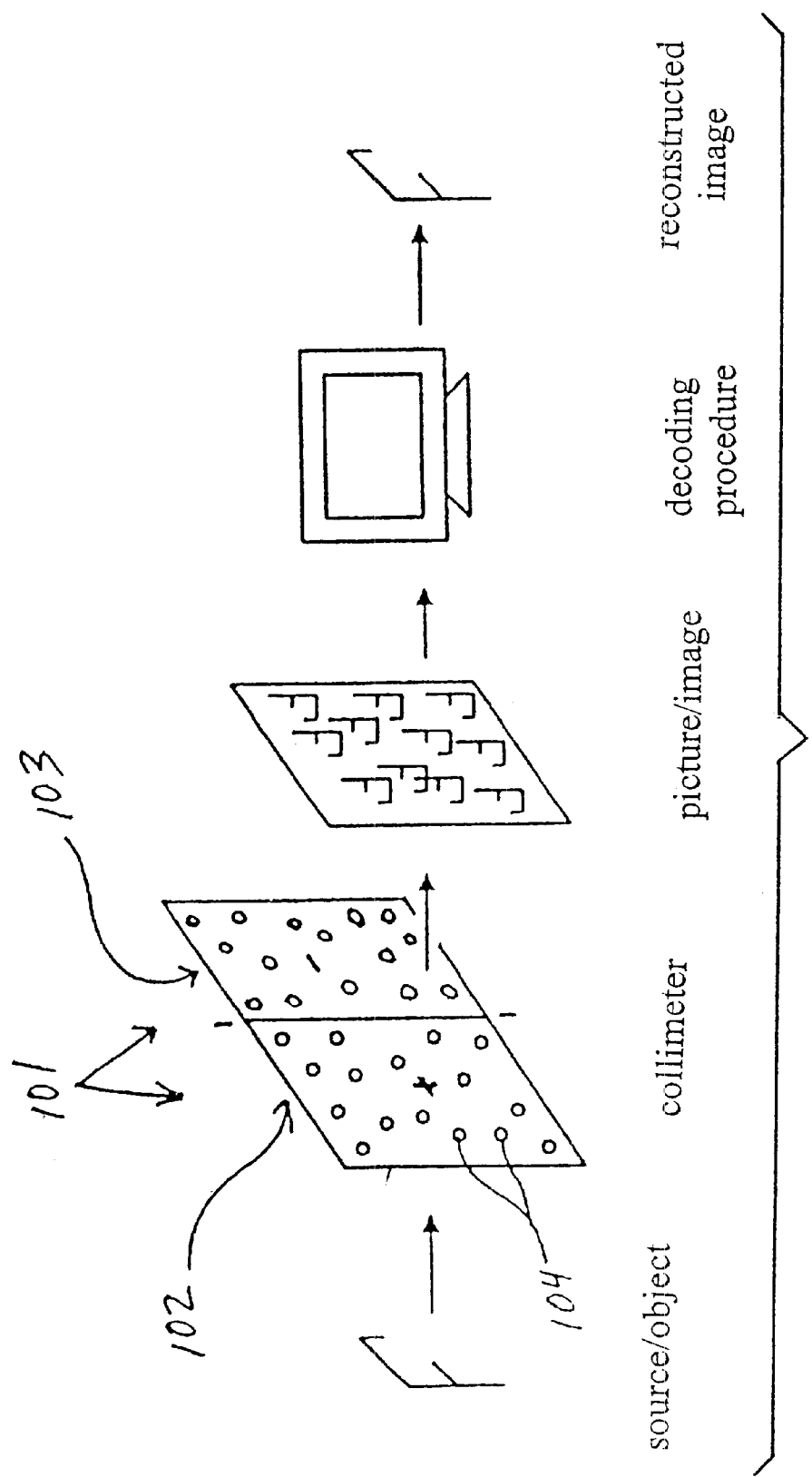
FIG. 3 illustrates a collimator of the present invention with a positive aperture portion and a negative aperture portion formed thereon.
Figure 4:
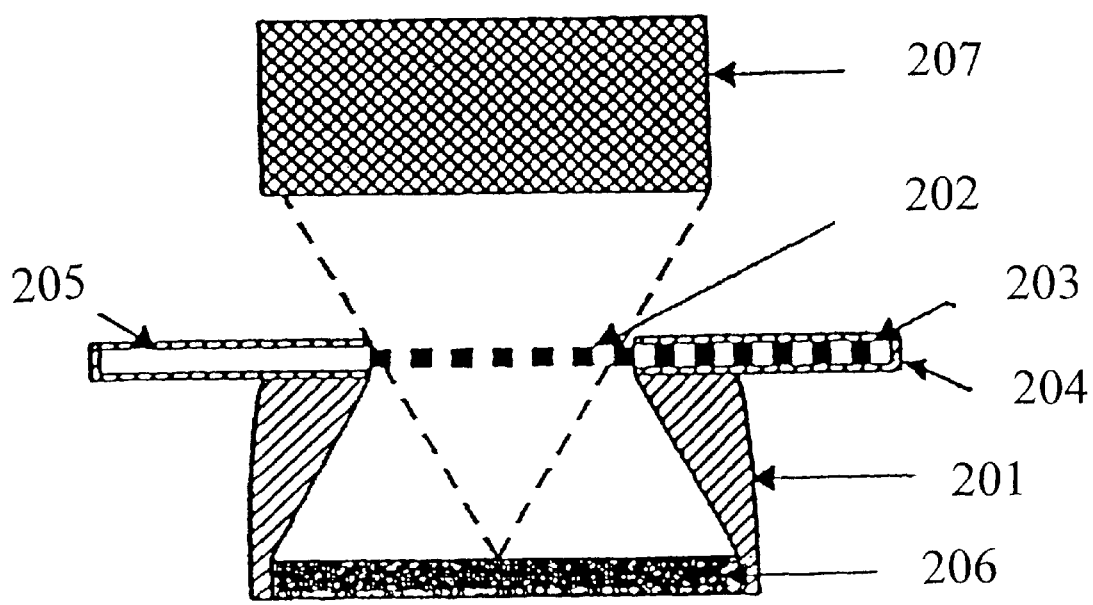
FIG. 4 is an illustration of a system employing the collimator of the present invention.

The two principal components of the present invention are a collimator having arrays of coded apertures and a position sensitive detector. Referring to FIG. 3, the collimator 101 includes a basic aperture pattern that represents a positive portion 102 on a first half of the collimator. The pattern is reversed on the second half of the collimator, thereby representing the negative portion 103 of the collimator. Each pinhole/aperture 104 in the collimator that represents part of the apertures may be, e.g., about 4 by 4 mm square.

A cross-sectional view of a system for incorporating the collimator is also shown in FIG. 3. The positive aperture 202 is shown exposed and the negative 203 is in a slot 204 formed withing a housing 201. After a first image is obtained/detected via the detector 206 after passing through the collimator 202 from the photon source 207, the collimator 202 is shifted to the left into the slot 205 opposite slot 204 to expose the negative aperture portion 203 of the collimator. The housing may be constructed of similar high Z materials as the collimator (e.g., lead, tungsten, etc.). As will be apparent to those skilled in the mechanical arts, a wide variety of configurations may be used to provide for switching the positive and negative collimators. The collimator or collimators may be slid, rotated, turned and the like to provide a positive and negative aperture image.

During operation, the aperture to detector distance may be of about 6 cm. The detector size may be, e.g., 163 by 185 mm square. The detector will generally be in a lead shield to eliminate the contribution from the photons coming from the areas outside the collimator's field of view. The source of gamma rays may, for example, be a compressed breast of the size of 200×100 mm square with cross-sectional thickness of 50 mm, which corresponds to the actual size of the object of interest.

To obtain the images depicted herein, the source was placed at the distance b=3.5 cm from the collimator. The shown imaging system has a rectangular field of vision (FOV) of approximately 9.5 cm by 10.8 cm. In the diagram, the FOV is represented by long dashed lines. This FOV corresponds to the central area of the source, which may be seen by the detector through the collimator.

Figure 5:
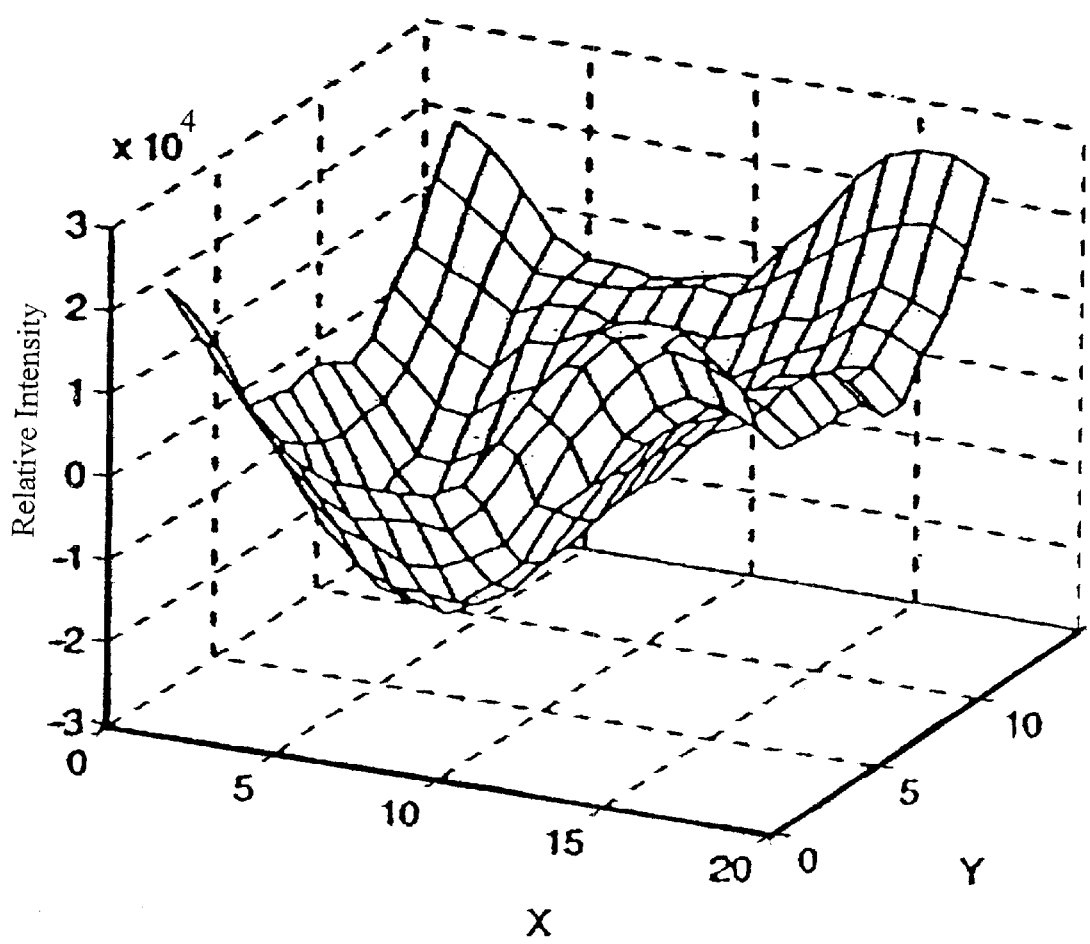
FIG. 5 illustrates a first representation of a specimen image as detected through a positive aperture section of a collimator.
Figure 6:
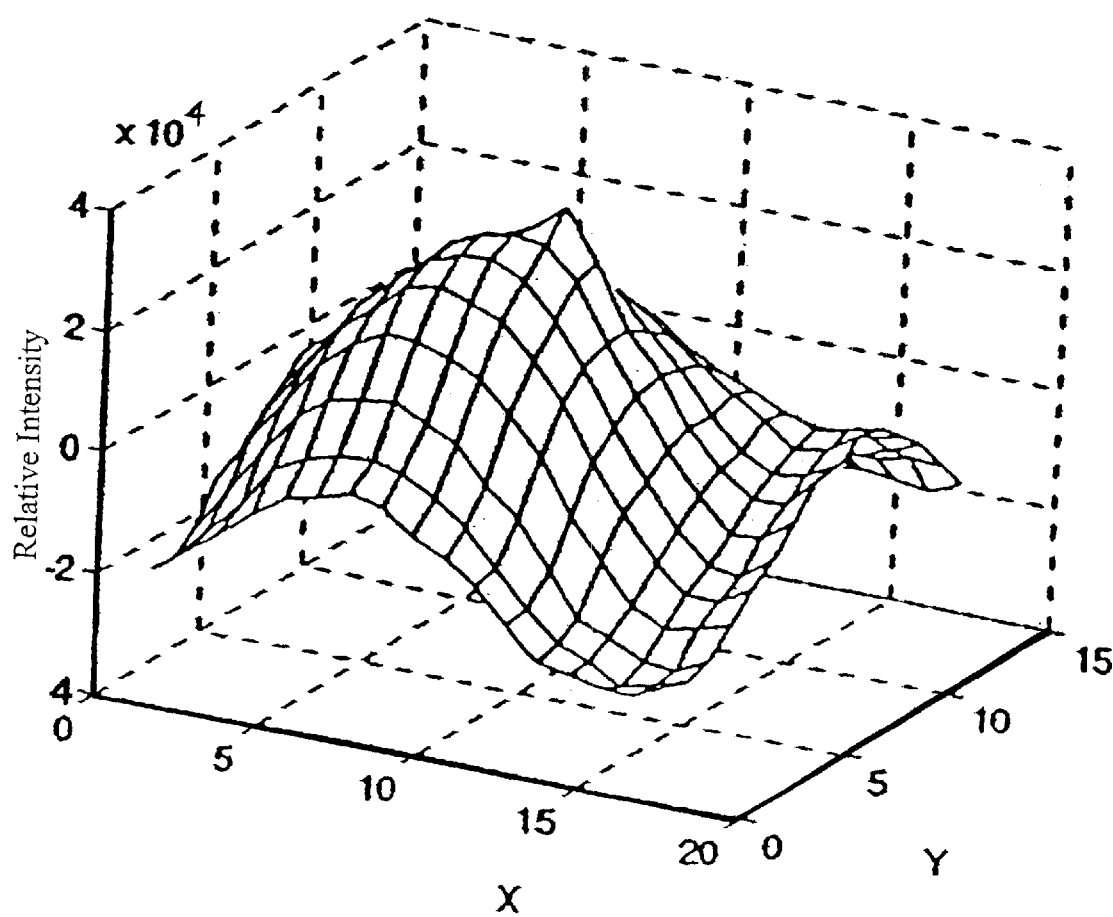
FIG. 6 illustrates a second representation of a specimen image as detected through a negative aperture section of a collimator.
Figure 7:
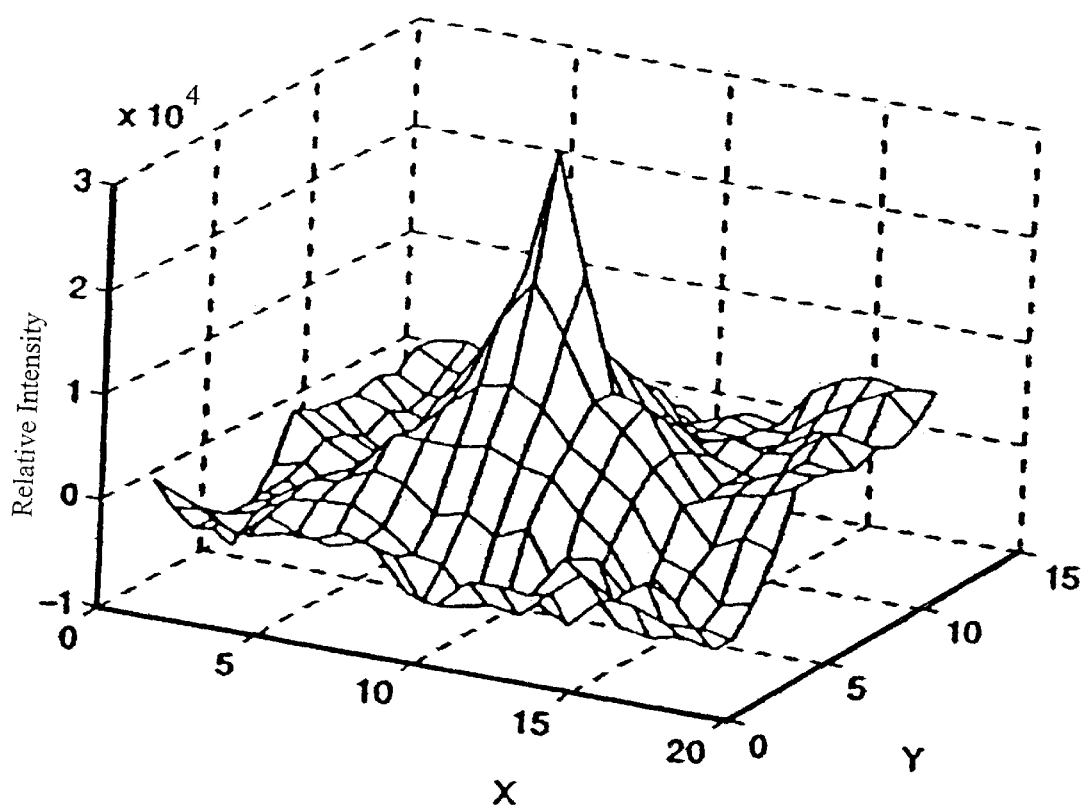
FIG. 7 illustrates a final representation of a specimen image representative of the summation of the images captured as shown in FIGS. 5 and 6, resulting in an enhanced image showing a reduction in background artifacts.

During operation of the imaging system, a first image of a photon-generating target is obtained using the positive aperture portion of the collimator. Referring to FIG. 5, a peak in the detected image occurs in a valley (artifact) produced by background light. This valley is generally considered an artifact in the image reconstruction. Next, the collimator is slid within the slot to provide a negative aperture portion at the aperture during exposure of the specimen. A second image is detected through the negative aperture resulting in a second image shown in FIG. 6. All opaque regions in FIG. 6 are generally reversed from the non-opaque regions of FIG. 5. The peak in the reconstructed image occurs on a hill (artifact) produced by the background. The proper form of this image should be a peak surrounded by a flat background. Creating a composite image by adding the images of FIGS. 5 and 6 together produces a factor of two increase in the signal from the bright source over that produced by the background as seen in FIG. 7.

The use of composite pictures described herein creates an improved signal to noise ratio and corrects for irregularities in detector efficiency. It is clear from the results shown in FIG. 7 that the elimination of artifacts improves the resolution of the imaging device. Therefore, the accuracy of medical imaging is improved using the present invention by elimination of background artifacts.

While there have been described herein what are considered to be preferred and exemplary embodiments of the present invention, other modifications of the invention shall be apparent to those skilled in the art form the teachings herein, and it is therefore desired to be secured in the appended claims all such modifications as fall within the true spirit and scope of the invention.

REFERENCES

Fenimore and Cannon, "Coded Aperture Imaging with Uniformly Redundant Arrays", Appl. Opt., vol. 17, No 3, p 337, 1978.

Dunphy, McConnel, Owens, Chup, Forrest, and Googins, "A Balloon-Borne Coded Aperture Telescope For Low-Energy Gamma-Ray Astronomy", Nucl. Instr. And Meth. Vol. 274, No 1–2, p 362, 1989.

Fenimore and Cannon, "Tomographical Imaging Using Uniformly Redundant Arrays", Appl. Opt., vol. 18, No 7, p 1052, 1979.

Maublant, de Latour, Mestas, Clemenson, Charrier, Feillel, Le Bouedec, Kaufmann, Daplat, and Veyre, "Technetium-99 m-Sestamibi Uptake in Breast Tumor and Associated Lymph Nodes", J. Nucl. Med., vol. 37, p 922, 1996.

MacWilliams and Sloane, "Pseudo-Random Sequences and Arrays", Proc. IEEE vol. 64, p 1715, 1976.

Boner and Antweiler, "Optimizing the Aperiodic Merit Factor of Binary Arrays", Signal Processing, vol. 30, p 1, 1993.

What is claimed is:

1. A collimator for use in medical imaging wherein substantial reduction of background artifacts is desired, said collimator comprising:
    a positive aperture portion having an array of positive apertures formed thereon; and
    a negative aperture portion having an array of negative apertures formed thereon.

2. The collimator of claim 1, further comprising:
    a housing for the aperture and detector that shields photons from all directions except for the aperture portions of the collimator;
    a slot formed within said housing for holding the collimator in direct orientation with a field of photon energy received through a specimen targeting window wherein said slot allows movement of the collimator in such a manner as to detect photons from a source with said positive aperture and negative aperture portions; and
    wherein the collimator is held within said slot such that one of the aperture portions is oriented to receive photons emanating from a source, and wherein the collimator is movable within said slot to allow the other negative aperture portions to also be oriented to receive photons emanating from a source.

3. The collimator of claim 2, further comprising a detector for receiving photons passing through the positive and negative apertured portions of the collimator, the detector counts the number of photons passing through the positive and negative collimators to produce positive and negative images, and for summing the positive and negative images to render a final image.

4. The collimator of claim 3, wherein said said collimator further comprises a plurality of apertures formed within said collimator having a radius in the range from 1 mm to 5 mm.

5. The collimator of claim 2, wherein said housing and said collimator are formed from substantially lead-based or heavy Z material.

6. The collimator of claim 1, wherein said collimator comprises a substantially lead-based or heavy Z material.

7. A medical imaging system, comprising:
    a housing having first and second ends, said housing substantially shielding a detector from interfering photon sources, wherein said first end forms an opening for directing photon energy from a monitored source into said housing through a collimator and said second end comprises a detector for receiving photon energy;
    a collimator at said first end having positive and negative apertured sections, the collimator being movable within the slot to independently expose either said positive or said negative apertured sections to a photon energy source located near said first end during imaging operations; and
    a detector for receiving photon energy through said housing and said collimator at said second end.

8. The medical imaging system of claim 7, wherein said collimator comprises lead-based or heavy Z material.

9. The medical imaging system of claim 8, wherein said housing comprises lead-based or heavy Z material.

10. The medical imaging system of claim 7, further comprising a detector for receiving photons passing through said positive and negative apertured portions of said collimator, said detector for converting said photons into a positive image and a negative image, wherein said positive and said negative image are summed to render a final image.

11. The medical imaging system of claim 9, wherein said said collimator further comprises a plurality of apertures formed within said collimator having a radius in the range from 1 mm to 5 mm.

12. A method of single photon emission computing tomography, comprising the steps of:
    receiving a first image from a photon source through a collimator having a positive aperture array;
    receiving a second image of said photon source through a collimator having a negative aperture array; and
    digitally summing said first and second images thereby resulting in a representation of said photon source from said first and second images wherein background artifacts are substantially removed from a representation of the image.

13. The method of claim 12, wherein the source of said photons being detected is an internal organ.

14. A method for medical imaging comprising:
    receiving a first image from a SPECT scan of an object through a coded aperture array collimator, the image being the attenuation of photons in an object;
    reversing said aperture, thereby reversing opaque region from non-opaque regions;
    receiving a second image from a SPECT scan of the object through said reversed aperture; and
    creating a composite image nearly representing said object by adding said first and second images, thereby substantially reducing background artifacts from the emission of photons representing said object.

15. The method of claim 14, wherein said adding of first and second images results in signal increase that is a factor of two.

16. The method of claim 14, wherein the source of said photons being detected is an internal organ.

17. The method of claim 14, wherein the source of said photons being detected is a breast.

18. The method of claim 14, wherein the source of aid photons being detected is a heart.

19. The method of claim 14, wherein the source of aid photons being detected is a brain.

20. The method of claim 14, wherein the source of said photons being detected is a human limb.

* * * * *